United States Patent
Haudenschild

(10) Patent No.: US 7,344,644 B2
(45) Date of Patent: Mar. 18, 2008

(54) METHOD AND SYSTEM FOR PURIFYING WATER

(75) Inventor: Chris Haudenschild, 1870 La Jolla Rancho Rd., La Jolla, CA (US) 92037

(73) Assignee: Chris Haudenschild, La Jolla, CA (US)

(*) Notice: Subject to any disclaimer, the term of this patent is extended or adjusted under 35 U.S.C. 154(b) by 71 days.

(21) Appl. No.: 11/361,865

(22) Filed: Feb. 23, 2006

(65) Prior Publication Data

US 2006/0191845 A1 Aug. 31, 2006

Related U.S. Application Data

(60) Provisional application No. 60/656,728, filed on Feb. 25, 2005.

(51) Int. Cl.
*C02F 3/00* (2006.01)
(52) U.S. Cl. ............... 210/617; 210/747; 210/151; 210/170.09; 210/170.11; 210/291; 405/127
(58) Field of Classification Search ............... 210/602, 210/617, 747, 150, 151, 162, 170.09, 170.11, 210/291; 405/127
See application file for complete search history.

(56) References Cited

U.S. PATENT DOCUMENTS

| | | | |
|---|---|---|---|
| 482,436 A * | 9/1892 | Deutsch ............... 210/291 |
| 553,424 A * | 1/1896 | Ricks ............... 210/170.09 |
| 699,032 A * | 4/1902 | Smith ............... 210/291 |
| 1,805,993 A * | 5/1931 | Miller ............... 210/170.09 |
| 4,218,318 A * | 8/1980 | Niimi et al. ............... 210/150 |
| 5,112,483 A | 5/1992 | Cluff |
| 5,228,998 A * | 7/1993 | DiClemente et al. ....... 210/150 |
| 5,536,420 A * | 7/1996 | Oyzboyd ............... 210/609 |
| 5,549,828 A | 8/1996 | Ehrlich |
| 5,993,649 A * | 11/1999 | DeBusk et al. ......... 210/170.09 |
| 6,095,719 A * | 8/2000 | Miya et al. ............... 405/127 |
| 6,277,274 B1 * | 8/2001 | Coffman ............... 210/150 |
| 6,387,265 B1 * | 5/2002 | Hosoya ............... 210/150 |
| 6,843,910 B1 * | 1/2005 | Thomas ............... 210/170.09 |
| 2005/0098488 A1 * | 5/2005 | Kelly et al. ............... 210/151 |

* cited by examiner

*Primary Examiner*—Christopher Upton
(74) *Attorney, Agent, or Firm*—Duckor Spradling Metzger & Wynne; Bernard L. Kleinke

(57) ABSTRACT

The disclosed methods and systems of water purification relate to burying an underdrain in situ under a filter media bed such as a particulate material bed, within a natural body of water. A pump is provided for withdrawing water from the underdrain at a sufficient rate to cause a complex biological matrix filter to proliferate on top of the filter media bed forming a portion of the floor of the body of the water. The filter media bed is positioned at a depth d of water between the water body surface and the water body floor so that the upper surface of the particulate material bed remains substantially undisturbed by wave motion or tidal action at the surface of the body of water to facilitate the proliferation of the biological matrix filter.

9 Claims, 1 Drawing Sheet

METHOD AND SYSTEM FOR PURIFYING WATER

RELATED APPLICATIONS

This application claims priority to U.S. provisional patent application Ser. No. 60/656,728, filed Feb. 25, 2005, and entitled "METHOD AND APPARATUS FOR PURIFYING WATER."

FIELD OF THE INVENTION

The present invention relates in general to a method and apparatus for purifying water. It more particularly relates to such a method and apparatus for the production of purified water in an efficient and cost effective manner.

BACKGROUND ART

This section describes the background of the disclosed embodiment of the present invention. There is no intention, either express or implied, that the background art discussed in this section legally constitutes prior art.

There is a worldwide need for the production of purified water. With the growth in population, the demand for water increases.

The need exists for both drinking water, as well as water used for other commercial and/or industrial applications, such as for cooling power plants. A variety of different types and kinds of water purification techniques, such as the technique disclosed in U.S. Pat. No. 5,112,483, have been proposed.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

CERTAIN EMBODIMENTS OF THE INVENTION

Figure 1:
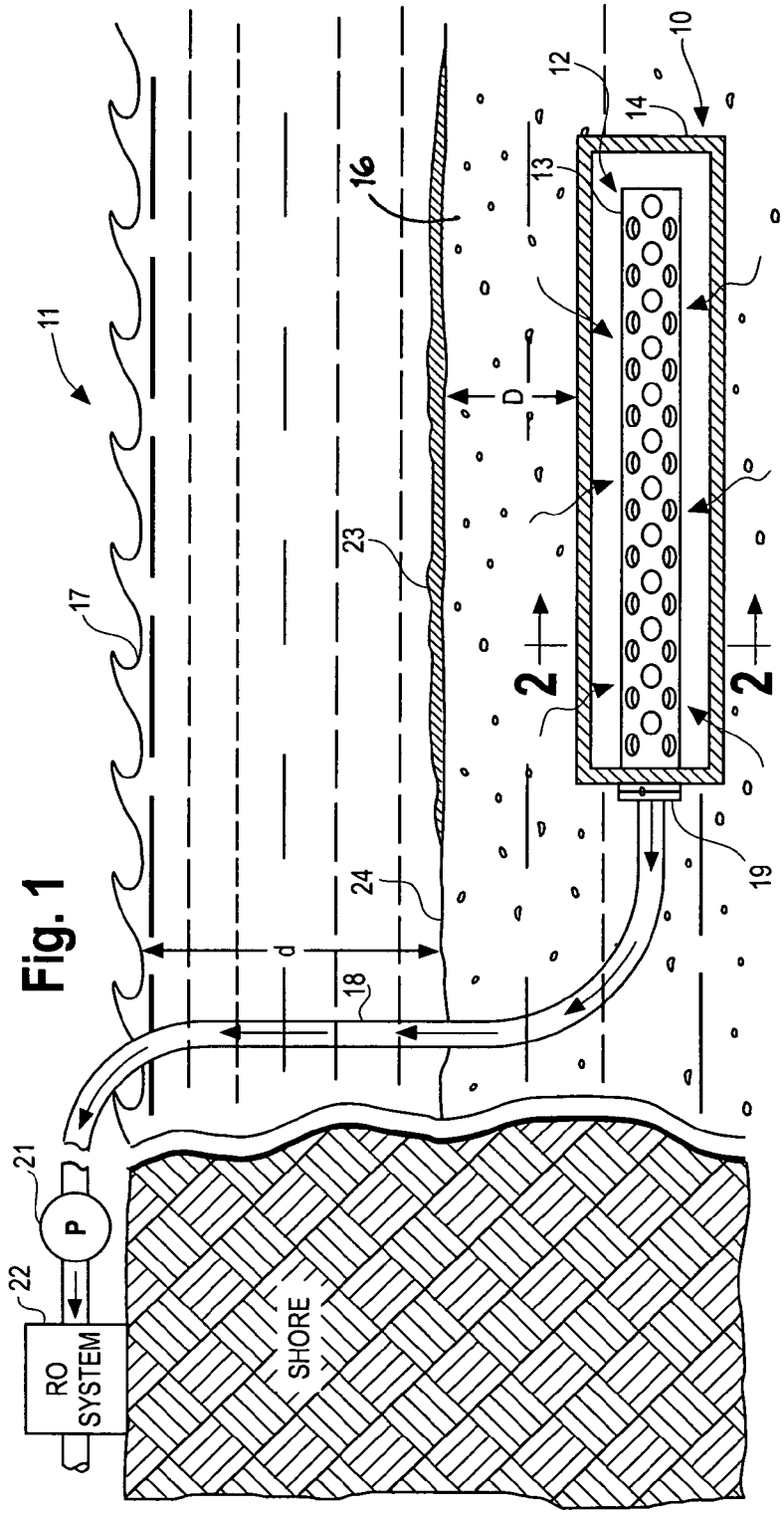
FIG. 1 is a diagrammatic view of a water purification system, which is constructed in accordance with an embodiment of the present invention.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

According to certain embodiments of the invention, a method and system for purifying water includes disposing an underdrain such as a pipe or pipes, buried in situ under a filter media bed such as a bed of particulate material, within a natural body of water such as an ocean, and pumping the water from the underdrain back to the shore for utilization in a reverse osmosis seawater desalination operation, or other commercial or industrial application such as cooling power plants.

According to an embodiment of the present invention, there is provided a method of making a water purification system. The method includes burying an underdrain in situ under a filter media bed such as a particulate material bed, within a natural body of water such as an ocean. A pump is provided for withdrawing water from the underdrain at a sufficient rate to cause a complex biological matrix filter to proliferate on top of the filter media bed forming a portion of the floor of the body of the water. The filter media bed is positioned at a depth d of water between the water body surface and the water body floor so that the upper surface of the particulate material bed remains substantially undisturbed by wave motion or tidal action at the surface of the body of water to facilitate the proliferation of the biological matrix filter.

According to another embodiment of the present invention, there is provided a water purification system which includes an underdrain buried in situ under a filter media bed such as a particulate material bed, within a natural body of water such as an ocean. A pump or pumps withdraw water from the underdrain at a sufficient rate to cause a complex biological matrix filter to proliferate on top of the filter media bed forming a portion of the floor of the body of water. The filter media bed is disposed at a depth d of water between the water body surface and the water body floor so that the upper surface of the filter media bed remains substantially undisturbed by wave motion or tidal action at the surface of the body of water to facilitate the proliferation of the biological matrix filter.

According to another embodiment of the present invention, there is provided a method for water purification using an underdrain buried in situ under a filter media bed such as a particulate material bed, within a natural body of water. Water is pumped from the underdrain at a sufficient rate to cause a complex biological matrix filter to proliferate on top of the filter media bed forming a portion of the floor of the body of water. The filter media bed is disposed at a depth d of water between the water body surface and the water body floor so that the upper surface of the particulate material bed remains substantially undisturbed by wave motion or tidal action at the surface of the body of water to facilitate the proliferation of the biological matrix filter.

Referring now to FIG. 1 of the drawings, there is shown a water purification system 10 in the form of an in situ biological filter system such as a sea based in situ sand biological filter system, which may be utilized in a natural body of water such as an ocean 11 or other body of water. The system 10 may include an underdrain 12 which may be in the form of a perforated pipe 13 or other similar type of device (not shown). The underdrain 12 may be enclosed within a rigid permeable sand barrier 14, which may be in the form of a perforated manifold 15, buried under a filter media bed such as a particulate material bed 16 of particulate material such as sand, in the floor of the ocean 11 below the surface 17 thereof. It should be understood that additional such underdrains may be utilized as well. Alternatively, other types of drains (not shown) and sand barriers may also be employed. Also, other types and kinds of filter beds may also be employed.

A conduit such as a pipe 18 is connected via a coupling 19 in fluid communication with the underdrain 12 to convey water from the underdrain 12 to a remote location such as the shore via a suitable pump 21 or other such device. For desalination purposes, if desired, a reverse osmosis system 22 may be coupled to the outlet of the pump 21 for removing salt content from the water being purified. Also, if desired, other desalination arrangements (not shown), as well as filters (not shown) or other purifiers (not shown) may also be employed.

The movement of the water through the filter media bed 16 causes a complex biological matrix filter bed 23 to proliferate a biological matrix filter such, for example, as a matrix of single and multi cell organisms, such as bacteria, fungi, protozoa, and others, on top of the filter bed 16 forming a portion of the floor 24 of the ocean 11. The biological matrix filter bed or "schnutzdecke" serves to remove, by metabolizing, most organic and some inorganic materials such, for example, as bacteria, viruses, giardia and cryptosporidium, as well as reduced turbidity, from being drawn into the sand bed 16 toward and into the underdrain 12.

The underdrain 12 is disposed sufficiently below the floor 24 of the ocean by a distance D to allow the particulate bed 16 to serve as a mechanical filter of entrained particles in the water moving toward and into the underdrain 12. The sand bed 16 may be the naturally occurring sand in the floor of the ocean 11 or may be sand or other particulate material added for the purposes as herein described. The depth D of the sand bed 16 above the underdrain 12 (the depth of the underdrain 12 below the floor 24 of the ocean) may be between about 0.5 meter and about 1.5 meters to provide for sufficient mechanical filtering of the water flowing toward the underdrain 12.

More particularly, the depth D may be between about 0.8 meter and about 1.2 meters, and may be a depth D is about 1.0 meters. It is desirable that the size of the grains of sand may be between about 150 microns and about 350 microns. More particularly, the size of the grains may be between about 200 microns and about 300 microns, and may be a size of about 250 microns.

Figure 2:
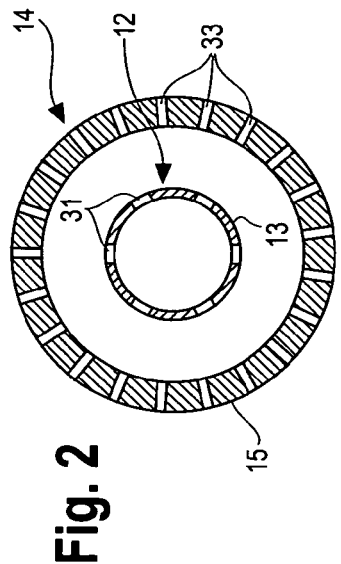
FIG. 2 is a sectional view of the system of FIG. 1, taken substantially on line 2-2 thereof.

Referring now to FIGS. 1 and 2 of the drawings, the perforated pipe 13 of the underdrain 12 includes a series of openings or holes 31 for admitting water to the interior of the pipe 13. The pipe 13 may be circular in cross-section and disposed within the perforated manifold of the particulate barrier 14. The manifold 15 includes a series of openings or slits 33 to admit water into the interior thereof, and for blocking particles such as sand to enter the interior of the manifold 15. In this regard, the size of the openings 33 are substantially smaller in size as compared to the size of the openings 31 in the perforated pipe 13.

According to a method of an embodiment of the invention, the underdrain 12 may be buried in the sandy floor of the ocean 11 at a sufficient distance from the shore so that there will be a sufficient depth d of water between the water surface 17 and the ocean floor 24 so that the upper surface of the sand bed remains substantially undisturbed by the wave motion or tidal action at the surface 17 and thus the biological matrix bed can become established and proliferate. The underdrain may be sufficiently close to the shore so that the water need only be pumped a reasonable distance to the shore.

The operation of the system 10 is analogous or at least somewhat similar to the operation of a conventional slow sand filter. The system 10 removes the suspended particles with effluent turbidities such, for example, as below about 1.0 nephelometric turbidity unit (NTU).

When the word "about" or "approximately" or other such terms are used, it is implied that there can be plus or minus twenty percent variations.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A method of making a water purification system, comprising:
   burying an underdrain in situ under a filter media bed within a natural body of water;
   providing a pump for withdrawing water from the underdrain at a sufficient rate to cause a biological matrix filter to proliferate on top of the filter media bed forming a portion of the floor of the body of the water;
   positioning the underdrain sufficiently below the water body floor by a distance D to allow the top surface of the filter media bed to serve as a mechanical filter of unwanted entrained particles in the water moving toward and into the underdrain, D being equal to between about 0.5 meter and about 1.5 meters; and
   positioning the filter media bed at a depth d of water between the water body surface and the water body floor so that the upper surface of the filter media bed remains substantially undisturbed by water motion at the surface of the body of water to facilitate the proliferation of the biological matrix filter,
   wherein the filter media bed is a particulate material bed composed of particles of a size between about 150 microns and about 350 microns.

2. A method according to claim 1, wherein D is equal to between about 0.8 meter and about 1.2 meters.

3. A method according to claim 2, wherein D is equal to between about 1.0 meter.

4. A method according to claim 1, wherein the particulate material particles are of a size between about 200 microns and about 300 microns.

5. A method according to claim 4, wherein the particulate material particles are of a size equal to about 250 microns.

6. A method according to claim 1, wherein the filter media bed is a particulate media bed composed at least partially of sand.

7. A method according to claim 1, wherein the underdrain includes a perforated pipe and a particle barrier at least partially surrounding the perforated pipe.

8. A method according to claim 7, wherein the particle barrier is in the form of a housing having small openings therein.

9. A method of water purification, comprising:
   using an underdrain buried in situ under a filter media bed within a natural body of water;
   pumping water from the underdrain at a sufficient rate to cause a biological matrix filter to proliferate on top of the filter media bed forming a portion of the floor of the body of the water; and
   wherein the filter media bed is disposed at a depth d of water between the water body surface and the water body floor so that the upper surface of the filter media bed remains substantially undisturbed by water motion at the surface of the body of water to facilitate the proliferation of the biological matrix filter, and positioning the underdrain sufficiently below the water body floor by a distance D to allow the top surface of the filter media bed to serve as a mechanical filter of unwanted entrained particles in the water moving toward and into the underdrain, D being equal to between about 0.5 meter and about 1.5 meters, and the filter media bed being a particulate material bed composed of particles of a size between about 150 microns and about 350 microns.

* * * * *